United States Patent [19]

Coogan

[11] Patent Number: 4,801,644
[45] Date of Patent: Jan. 31, 1989

[54] COATING COMPOSITIONS

[75] Inventor: Richard G. Coogan, North Reading, Mass.

[73] Assignee: Polyvinyl Chemicals Inc., Wilmington, Mass.

[21] Appl. No.: 915,098

[22] Filed: Oct. 3, 1986

[30] Foreign Application Priority Data

Oct. 4, 1985 [GB] United Kingdom ................. 8524579

[51] Int. Cl.$^4$ ............................................. C08G 18/42
[52] U.S. Cl. .................................... 524/839; 524/840; 528/67; 528/85; 560/25; 560/26; 560/115; 560/132; 560/158
[58] Field of Search .................. 524/839, 840; 528/67, 528/85; 560/25, 26, 115, 132, 158

[56] References Cited

U.S. PATENT DOCUMENTS

| 3,959,348 | 5/1976 | Reiff et al. | 560/26 |
| 4,066,591 | 1/1978 | Scriven et al. | 428/457 |
| 4,269,748 | 5/1981 | Nachtkamp et al. | 524/839 |
| 4,294,934 | 10/1981 | Grögler | 528/58 |
| 4,324,716 | 4/1982 | Reischl et al. | 524/839 |
| 4,387,181 | 6/1983 | Brown et al. | 524/83 |

FOREIGN PATENT DOCUMENTS 3139966  4/1983  Fed. Rep. of Germany .
1087388  10/1967  United Kingdom .

Primary Examiner—Maurice J. Welsh
Assistant Examiner—Samuel A. Acquah
Attorney, Agent, or Firm—Cushman, Darby & Cushman

[57] ABSTRACT

Aqueous polyurethane dispersions useful as coating compositions wherein the polyurethane comprises the reaction product of (a) an isocyanate-terminated polyurethane prepolymer containing carboxylic acid salt groups formed by reacting:
  (i) a polyisocyanate component containing at least 1% by weight of diphenylmethane-2,4'-diisocyanate, and
  (ii) an active hydrogen containing component containing a polyol and a carboxy group containing diol or triol, and
(b) an active hydrogen containing chain extender.

13 Claims, No Drawings

COATING COMPOSITIONS

This invention relates to coating compositions and especially to polyurethane coating compositions in the form of aqueous dispersions.

Polyurethane coating compositions are well known and are applied to a variety of substrates to provide fast curing surface coatings having high abrasion resistance, skin flexibility, good adhesion to the substrate and a high level of chemical resistance. The coating compositions may be formulated as solventless liquid two-component systems or as solutions or dispersions of a polyurethane polymer in a suitable liquid medium.

In particular, it is known to formulate coating compositions in the form of aqueous dispersions of polyurethane polymers. Thus, U.S. Pat. No. 4,066,591 describes aqueous dispersions obtained by dispersing an isocyanate-terminated prepolymer which contains acid salt groups in an aqueous medium and then reacting the prepolymer with an active hydrogen containing chain extender in the aqueous medium.

Aqueous polyurethane dispersions have been proposed for providing coatings on several substrates, for example plastics, metal, glass, wood, concrete, rubber, paper and textiles. Those available commercially are largely based on toluene diisocyanate. The preparation of similar dispersions from prepolymers based on diphenylmethane diisocyanate is said in International Application WO No. 81/02894 to be impossible because of exothermic gelling and foaming. To overcome this problem, WO No. 81/02894 describes dispersions based on blocked prepolymers of aromatic polyisocyanates, especially diphenylmethane-4,4'-diisocyanate.

It has now been found that dispersions of polyurethane polymers prepared from polyisocyanate compositions containing diphenylmethane-2,4'-diisocyanate are more resistant to gelation than corresponding dispersions based entirely on diphenylmethane-4,4'-diisocyanate and that the derived coatings have improved solvent and water resistance and superior physical properties compared with corresponding coatings based entirely on toluene diisocyanate.

Accordingly, the invention provides an aqueous polyurethane dispersion wherein the polyurethane comprises the reaction product of
(a) an isocyanate-terminated polyurethane prepolymer containing carboxylic acid salt groups formed by reacting:
  (i) a polyisocyanate component containing at least 1% by weight of diphenylmethane-2,4'-diisocyanate, and
  (ii) an active hydrogen containing component containing a polyol and a carboxy group containing diol or triol, and
(b) an active hydrogen containing chain extender.

The polyisocyanate component used in the preparation of the prepolymer can be a mixture of diphenylmethane-2,4'-diisocyanate with at least one other organic polyisocyanate, such mixtures containing at least 1%, preferably at least 5%, more preferably at least 10% by weight of the diphenylmethane-2,4'-diisocyanate.

Thus, the polyisocyanate component may be a mixture of the 2,4'- and 4,4'-isomers of diphenylmethane diisocyanate, possibly with small amounts of the 2,2'-isomer. Such mixtures can contain from 5 to 70% by weight of the 2,4'-isomer although mixtures containing more than 70% or less than 5% by weight can also be used.

Other polyisocyanate components which may be used in the preparation of the prepolymers include the commercially available mixtures of methylene-bridged polyphenyl polyisocyanates known as polymeric or crude MDI. Such mixtures contain diphenylmethane-4,4'- and 2,4'-diisocyanates together with related methylene-bridged polyphenyl polyisocyanates having three or more isocyanate groups per molecule. These mixtures may be used as the sole polyisocyanate component in some cases or, alternatively, they may be used together with the aforementioned blends of 4,4'- and 2,4'-diphenylmethane diisocyanates.

Further polyisocyanate components which may be used include carrbodiimide/uretonimine modified diphenylmethane diisocyanates which may be obtained in known manner by treating a mixture of the 4,4'- and 2,4'-isomers with a catalyst for the conversion of isocyanate groups to carbodiimide groups. Suitable catalysts, which include trialkyl phosphates, phosphoramides, phospholenes and phospholidines, have been described in United Kingdom Patent Specification No. 1476088.

Still further polyisocyanate components which may be used in the preparation of the coating compositions of the invention include mixtures of any of the above-mentioned diphenylmethane diisocyanate compositions with other organic polyisocyanates, especially the commercially available polyisocyanates such as toluene diisocyanate. Such mixtures should contain at least 1% by weight of the diphenylmethane-2,4'-diisocyanate. Useful mixtures contain toluene diisocyanate, especially an 80/20 mixture of the 2,4- and 2,6-isomers, and one of the above-mentioned diphenylmethane diisocyanate compositions, especially a mixture of the 2,4'- and 4,4'-isomers. Thus, a useful polyisocyanate component comprises:

(i) from 10 to 60% by weight of toluene diisocyanate, and (ii) from 90 to 40% by weight of a mixture of 4,4'- and 2,4'-diphenylmethane diisocyanates containing from 5 to 70% by weight of the 2,4'-isomer.

Particular mention may be made of mixtures comprising from 30 to 50% by weight of toluene diisocyanate and from 70 to 50% by weight of a 4,4'-/2,4'-diphenylmethane diisocyanate mixture containing from 10 to 40%, especially 20 to 30% by weight of the 2,4'-isomer.

The polyol present in the active hydrogen containing component used to make the prepolymer may have a molecular weight of from 62 to about 6000 and is preferably a diol. Suitable polyols may be selected from polymeric polyols having molecular weights of from about 300 to about 6000, especially 500 to 1500 and lower molecular weight polyols having molecular weights from 62 to about 300. Mixtures of polyols may be used, especially mixtures of at least one polymeric polyol and at least one lower molecular weight polyol in addition to the carboxy group containing diol or triol.

Suitable polymeric polyols include polyethers with two or more terminal hydroxyl groups such as may be obtained by the polymerisation of a cyclic oxide, for example ethylene oxide, propylene oxide and tetrahydrofuran, in the presence where necessary of a polyfunctional initiator such as water, ethylene glycol, glycerol or aniline. The polyethers and methods for their preparation have been fully described in the prior art. Especially suitable polyethers include polypropylene ether glycols, poly(propylene-ethylene) ether glycols and polytetramethylene ether glycols having molecular weights in the range of from 500 to 6000.

Other suitable polymeric polyols include polyester polyols such as may be prepared by reacting polyhydric, especially dihydric, alcohols such as ethylene glycol, diethylene glycol or propylene glycol with polycarboxylic, especially dicarboxylic, acids or their ester-forming derivatives, for example succinic, glutaric and adipic acids and phthalic and tetrachlorophthalic anhydrides. Polyesters may also be obtained by the polymerisation of lactones, for example caprolactone, in conjunction with a polyol.

Still other suitable polymeric polyols include polythioethers, polyacetals, polycarbonates and polyolefins such as have already been described in the urethane art.

Lower molecular weight polyols which may be used in making the prepolymers include ethylene glycol, propylene glycol, diethylene glycol, trimethylolpropane, glycerol, cyclohexane dimethanol (1,4-bis-hydroxymethylcyclohexane), furan dimethanol, bis-2-hydroxyethylhydroquinone, and hydroxyethyl esters of phthalic acids.

The carboxy group containing diol or triol used in making the prepolymer may be a dihydroxy alkanoic acid of the formula:

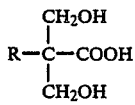

wherein R is hydrogen or alkyl. The preferred carboxy containing diol is 2,2-dimethylol propionic acid. If desired, the carboxy-containing diol or triol may be incorporated into a polyester by reaction with a dicarboxylic acid before being incorporated into the prepolymer. Useful materials include the fumarate polyether glycols described in U.S. Pat. No. 4,460,738.

Useful active hydrogen containing components comprise:

(i) a polymeric diol having a molecular weight of from 500 to 6000, especially from 500 to 1500, (ii) from 1 to 2 moles, per mole of polymeric diol, of a carboxy group containing diol or triol, and (iii) from 0 to 1 mole, per mole of polymeric diol, of a diol having a molecular weight from 62 to 300.

Particularly preferred active hydrogen components include those in which the polymeric diol is a polytetramethylene ether glycol, a carboxy-containing diol is present in an amount of from 1.2 to 1.6 moles per mole of polymeric diol and the low molecular weight diol is cyclohexane dimethanol.

The isocyanate-terminated polyurethane prepolymer may be prepared in conventional manner by reacting a stoichiometric excess of the polyisocyanate component with the active hydrogen containing component under substantially anhydrous conditions at a temperature between about 30° C. and about 130° C. until reaction between the isocyanate groups and the hydroxyl groups is substantially complete. The polyisocyanate component and the active hydrogen containing component are suitably reacted in such proportions that the ratio of number of isocyanate groups to the number of hydroxyl groups is in the range from about 1.1:1 to about 6:1, preferably within the range of from 1.5:1 to 3:1.

If desired, catalysts such as dibutyltin dilaurate and stannous octoate may be used to assist prepolymer formation and a non-reactive solvent may be employed to control the viscosity. Suitable solvents which may be used include acetone, methylethylketone, dimethylformamide, ethylene carbonate, propylene carbonate, N-methylpyrrolidone, ethyl acetate, ethylene and propylene glycol diacetates, alkyl ethers of ethylene and propylene glycol monoacetates, toluene, or xylene. The preferred solvents are N-methylpyrrolidone, dimethyl sulphoxide and dialkyl ethers of glycol acetates or mixtures of N-methylpyrrolidone and methyl ethyl ketone.

The prepolymer may be dispersed in water using techniques well known in the art. Preferably, the prepolymer is added to the water with agitation or, alternatively, water may be stirred into the prepolymer.

Conversion of the carboxy groups present in the prepolymer to salt groups may be effected either before or simultaneously with the addition of the prepolymer to water. The neutralising agent used to effect salt formation may suitably be a tertiary amine such as triethylamine, triethanolamine or N-methylmorpholine, an alkaline hydroxide such as sodium or potassium hydroxide or a quaternary ammonium hydroxide.

The active hydrogen containing chain extender which is reacted with the prepolymer is suitably ammonia, a primary or secondary aliphatic, alicyclic, aromatic, araliphatic or heterocyclic amine, especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, 3,3'-dinitrobenzidine, 4,4'-methylenebis(2-chloroaniline), 3,3'-dichloro-4,4'-biphenyl diamine, 2,6-diaminopyridine, 4,4'-diaminodiphenylmethane, menthane diamine, m-xylene diamine, isophorone diamine, N-methyl-3,3'-diaminopropylamine, and adducts of diethylene triamine with acrylate or its hydrolyzed products. Also materials such as hydrazine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semicarbazide, bis-hydrazide carbonic esters of glycols such as any of the glycols mentioned above. Also materials containing functional groups such as hydroxyl containing diamines, such as, for example, hydroxyethylethanolamine and salt containing diamines, such as, for example, sodium(2-aminoethyl)-2-aminoethane sulphonate or diaminocarboxylic acids such as 2,6-diaminohexanoic acid, cystine or 3,5-diaminobenzoic acid can be used in conjunction with the above-mentioned amines to enhance the stability of dispersion. Finally, a mono functional amine can also be used in mixture with the above-mentioned amines to limit the growth of the polymer molecular weight. Examples of suitable monoamines include butylamine, dibutylamine, ethanolamine, diethanolamine and trimethylolmethylamine.

The chain extension can be conducted at elevated, reduced or ambient temperatures. Convenient temperatures are from about 5° to 95° C. or more, preferably from about 10° to about 45° C.

The amount of chain extender employed should be approximateLy equivalent to the free-NCO groups in the prepolymer, the ratio of active hydrogens in the chain extender to NCO groups in the prepolymer preferably being in the range from 1.0 to 1.75:1. The resulting aqueous dispersions of this invention are advantageously employed as coating compositions, for which purpose they may be further diluted with water and/or organic solvents, or they may be supplied in more concentrated form by evaporation of water and/or organic components of the liquid medium. As coating compositions they may be applied to any substrate including wood, metals, glass, cloth, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties.

The invention is illlustrated but not limited by the following Examples:

EXAMPLE 1

A 1000 ml 4-neck resin flask equipped with thermometer, overhead stirrer and nitrogen was charged with 143 g (0.286 eq) of polytetramethylene ether glycol of molecular weight 1000 (Teracol 1000), 20.4 g (0.286 eq) cyclohexane dimethanol, 28.9 g (0.432 eq) of dimethanol propionic acid and 152 g of N-methylpyrrolidone. The reactor was heated to 60° C. until all the dimethanol propionic acid dissolved and was then cooled to 15° C. To the reactor was added 164.2 g (1.55 eq) of a mixture containing 96.4 g (0.775 eq) of a 77:23 ratio of 4,4':2,4'-diphenylmethane diisocyanate and 67.4 g (0.775 eq) of a 80:20 ratio of 2,4:2,6-toluene diisocyanate. The reaction was allowed to exotherm to 60°-70° C. while cooling over an ice bath. After the exotherm was complete the reaction was warmed at 65° C. for two hours. The NCO content of the prepolymer was 4.1%.

A dispersion of the polymer was prepared by feeding 400 g of the prepolymer at 45° C. into 500 g of deionized water containing 20 g triethylamine, 37.8 g of 16% hydrazine, and 3.0 g of N-95 surfactant. The dispersion temperature was controlled between 15°–25° C. and was allowed to stir one hour after the addition of prepolymer was complete. The dispersion had a pH of 8.5, viscosity of 85 cps and a solid content of 30.5%.

EXAMPLE 2

A 1000 ml 4-neck resin flask equipped with thermometer, overhead stirrer and nitrogen was charged with 143 g (0.286 eq) of polytetramethylene glycol of molecular weight 1000, 20.4 g (0.286 eq) of cyclohexane dimethanol, 28.9 g (0.432 eq) of dimethanol propionic acid and 165 g of N-methylpyrrolidone. The reactor was heated to 60° C. until all the dimethanol propionic acid dissolved and was cooled to 15° C. To the reactor was added 193 g (1.55 eq) of a mixture containing a 50:50 ratio of 4,4':2.4'-diphenylmethane diisocyanate. The reaction was allowed to exotherm to 65° C. while cooling over an ice bath. After the exotherm was complete the reaction was warmed to 65° C. for two hours. The NCO content of the prepolymr was 3.6%.

A dispersion of the polymer was prepared by feeding 400 g of the prepolymer at 45° C. into 500 g of deionized water containing 19 g triethylamine, 33.4 g of 16% hydrazine and 3.0 g of N-95 surfactant. The dispersion temperature was controlled between 20°–30° C. and was allowed to stir one hour after the addition of prepolymer was complete. The dispersion had a pH of 8.5, viscosity of 154 cps and a solids content of 30%.

EXAMPLE 3

Prepolymers and their dispersions were made according to the following formulations:

| | EQ | A | B | C | D |
|---|---|---|---|---|---|
| polytetramethylene glycol (MW1000) | 0.4 | 200 g | 200 g | 200 g | 200 g |
| dimethanol propionic acid | 0.6 | 40.2 g | 40.2 g | 40.2 g | 40.2 g |
| N—methylpyrrolidone | | 160 g | 160 g | 207 g | 250 g |
| methylethylketone | | 64 g | 64 g | 68 g | 71 g |
| MDI 4,4':2,4' | 1.4 | | | | |
| 77:23 | | 175 g | | | |
| 89:11 | | | 175 g | | |
| 95.5 | | | | 175 g | |
| 100.0 | | | | | 175 g |
| Viscosity of dispersion (centipoises) | | 204 | 150 | 336 | Gelled |
| Solids Level % | | 25 | 25 | 25 | 20 |

Formulation D based on pure 4,4'-diphenylmethane diisocyanate required a higher solvent level because of its high viscosity and had to be dispersed in water at a lower solids level. All prepolymers were extended with hydrazine at 0.95 eq level. Prepolymers A, B and C could be dispersed with only a few gel particles forming giving clear dispersions with acceptable viscosity. The dispersion from prepolymer D based on pure 4,4'-MDI gelled rapidly.

EXAMPLE 4

The prepolymer described in Example 1 was dispersed in water as described in that Example except that the hydrazine used as chain extender was replaced by mixtures, in a 50:50 equivalents ratio, of hydrazine with various diamines. The total amount of extender used perisocyanate group was 0.97 equivalents. In all cases, a stable dispersion was obtained, their properties being as follows:

| Extender | Ethylene diamine: Hydrazine | Menthane diamine: Hydrazine | 1,3-Phenylenediamine Hydrazine |
|---|---|---|---|
| Viscosity of dispersion (cp) | 300 | 300 | 150 |
| Solids (%) | 30 | 30 | 30 |
| Particles of gel in dispersion | None | None | None |

EXAMPLE 5

The following Table gives the formulations of prepolymers made from two MDI isomer mixtures and from TDI and the formulations of dispersions made from the prepolymers. The Table also gives the properties of the dispersions and of the derived coatings.

|  | Eq | A | B | C |
|---|---|---|---|---|
| Polytetramethylene glycol (M.W.1000) | 0.45 | 225 g | 225 g | 225 g |
| Dimethanol propionic acid | 0.55 | 36.8 | 36.8 | 36.8 |
| Diphenylmethane diisocyanate |  |  |  |  |
| [77:23 4,4':2,4'MDI] | 1.5 | 187.5 |  |  |
| [50:50 4,4':2,4'MDI] | 1.5 |  | 187.5 |  |
| Toluene diisocyanate | 1.5 |  |  | 130.5 |
| Hydrazine | 0.475 | 7.6 | 7.6 | 7.6 |
| Methyl ethyl ketone |  | 32 | 32 | 28 |
| N—Methyl pyrrolidone |  | 160.5 | 160.5 | 140 |
| Solids % |  | 30 | 30 | 30 |
| Viscosity, cps |  | 216 | 184 | 122 |
| Tensile strength (psi) |  | 6133 | 5408 | 3700 |
| 100% Modulus (psi) |  | 2578 | 2488 | 1815 |
| Elongation % |  | 315 | 300 | 268 |
| 7 Day Water Immersion 22° C. |  | No rust or blisters | No rust or blisters | Rusted and blistered |
| Sward Hardness |  | 24 | 24 | 18 |

The 7-Day Water Immersion test mentioned in the Table refers to the immersion of a coated steel bar.

It can be seen that the properties of the coating derived from the TDI prepolymer are inferior in all respects to the properties of the coatings derived from the MDI prepolymers.

EXAMPLE 6

A polyol solvent blend was prepared by mixing 143 g (0.286 eq) of polytetramethylene glycol of molecular weight 1000, 28.7 g (0.428 eq) of dimethanol propionic acid, 20.4 g (0.286 eq) of cyclohexane dimethanol, 127 g of N-methylpyrrolidone and 25 g of methyl ethyl ketone. The mixture was heated to 60° C. until all the dimethanol propionic acid had dissolved and was then cooled to 25°-30° C.

A polyisocyanate blend was prepared by mixing 67.4 g (0.775 eq) of 80:20 2,4:2,6-toluene diisocyanate, 18.0 g (0.135 eq) of a crude MDI composition of average functionality 2.2 (MF-182 ex Rubicon) and 80.0 g (0.64 eq) of 77:23 4,4':2,4'-diphenylmethane diisocyanate, the latter having been melted at 40°-50° C. The polyisocyanate blend was cooled to 25°-30° C. and held under nitrogen.

The polyol solvent blend was fed into the stirred polyisocyanate blend over a period of one hour, the temperature being allowed to rise to 50°-55° C. After the addition of polyol was complete, the mixture was allowed to react at 60°-65° C. for 2 hours and was then cooled to 40°-45° C. giving a prepolymer having an NCO content of 4.2%.

A dispersion was prepared by adding the prepolymer (509.5 g) at 40° C. over a 20-30 minute period to 654.5 g of deionised water at 15° C. containing 23.8 g of triethylamine and 12.74 g of 64% hydrazine. The dispersion had a pH of 8.0, a solids content of 31% and a viscosity in the range 100-300 cp. The derived polymer had a tensile strength in the range 6500-7500 psi, 100% modulus in the range 4100-4500 psi and elongation of 240-280%.

The solvent resistance of the polymer was slightly higher and the water resistance much higher than for polymers obtained from formulations containing no higher functionality isocyanate.

EXAMPLE 7

Using the procedures described in the previous Examples, a prepolymer and then an aqueous dispersion were prepared from the following components, all parts being by weight:

| Polytetramethylene glycol 1000 | 27.7 |
|---|---|
| Cyclohexane dimethanol | 3.9 |
| Dimethanol propionic acid | 5.6 |
| N—methylpyrrolidone | 24.6 |
| Methyl ethyl ketone | 4.8 |
| Toluene diisocyanate (80:20) | 13.0 |
| MDI (77:23 4,4':2,4') | 18.7 |
| Hydrazine | 1.5 |

Corresponding prepolymers and dispersions were made from formulations in which the polytetramethylene glycol was replaced by equivalent amounts of
(1) polypropylene glycol of molecular weight 1000 available from Olin as Poly G20-112,
(2) a polyester diol of molecular weight 1000 available from Ruco as S1015-120,
(3) a polycaprolactone diol of molecular weight 860 available from Union Carbide as Tone 230.

The properties of the dispersions and of the derived polymers are given in the following Table.

| POLYOL TYPE | POLYPROPYLENE GLYCOL OLIN 20-112 | POLYESTER DIOL S1015-120 | POLYCAPROLACTONE DIOL Tone 230 | POLYTETRAMETHYLENE DIOL Teracol 1000 |
|---|---|---|---|---|
| Viscosity | 940 | 286 | 84 | 310 |
| pH | 7.9 | 8.0 | 8.0 | 8.2 |
| Solids | 30 | 30 | 30 | 31 |
| Tensile psi | 4244 | 4800 | 6590 | 6450 |
| Elongation % | 206 | 193 | 215 | 370 |
| 100% Mod. psi | 3058 | 3883 | 4716 | 4500 |
| Sward Hardness | 16 | 18 | 21 | 24 |

EXAMPLE 8

The preparation of the polytetramethylene glycol formulation described in example 7 was repeated replacing the hydrazine by an equivalent amount of 1,4-phenylene diamine.

The properties of the polymers made using the two extenders were as follows:

|  | Hydrazine | 1,4-Phenylene diamine |
|---|---|---|
| Tensile strength (psi) | 6450 | 7540 |
| 100% Modulus (psi) | 4500 | 4957 |
| Elongation (%) | 300 | 200 |
| Sward Hardness | 24 | 28 |
| Chemical Resistance |  |  |
| Toluene | 10 | 10 |

-continued

|  | Hydrazine | 1,4-Phenylene diamine |
|---|---|---|
| 1,1,1-trichloroethane | 10 | 10 |
| Water | 10 | 10 |
| Methyl ethyl ketone | 8 | 9 |
| Isopropanol | 10 | 10 |
| Methanol | 8 | 10 |
| Water immersion test 52° C. 7 days | Completely white | No effect | the replacement of hydrazine by 1,4-phenylene diamine has improved the solvent resistance and water resistance of the polymer.

EXAMPLE 9

A 1000 ml 4-neck resin flask equipped with thermometer, overhead stirrer and nitrogen was charged with 143 g (0.286 eq) of polytetramethylene etherglycol of molecular weight 1000, 28.3 g (0.286 eq) of bis(2-hydroxyethyl)hydroquinone, 28.9 g (0.432 eq) of dimethanol propionic acid and 130 g of N-methylpyrrolidone. The reactor was heated to 60° C. until all the dimethanol propionic acid dissolved and was then cooled to 15° C. To the reactor was added 164.2 g (1.55 eq) of a mixture containing 96.4 g (0.775 eq) of a 77:23 ratio of 4,4':2.4'-diphenyl methane diisocyanate and 67.4 g (0.775 eq) of a 80:20 ratio of 2,4:2,6-toluene diisocyanate. The reaction was allowed to exotherm to 60°–70° C. while cooling over an ice bath. After the exotherm was complete, the reaction was warmed at 65° C. for two hours. The NCO content of the prepolymer was 4.2%.

A dispersion of the polymer was prepared by feeding 200 g of the prepolymer at 45° C. into 242 g of deionized water containing 9.9 g triethylamine, 19.2 g of 16% hydrazine. The dispersion temperature was controlled between 15°–25° C. and was allowed to stir one hour after the addition of prepolymer was complete. The dispersion had a pH of 8.0, viscosity of 120 cps and a solid content of 31%.

The following Table gives the compositions of further dispersions (Examples 10–20) prepared by the general method of Example 9.

|  | Example 10 | | Example 11 | | Example 12 | | Example 13 | | Example 14 | | Example 15 | | Example 16 | |
|---|---|---|---|---|---|---|---|---|---|---|---|---|---|---|
|  | e-quiv | g | e-quiv | g | e-quiv | g | e-quiv | g | e-quiv | g | e-quiv | g | e-quiv | g |
| Diethylene glycol diester of phthalic acid |  |  |  |  |  |  |  |  | 0.382 | 65.3 |  |  |  |  |
| Polytetramethylene diol |  |  |  |  |  |  |  |  |  |  |  |  |  |  |
| 1000 m.w. |  |  |  |  | 0.286 | 143 | 0.286 | 143 | 0.19 | 95.0 |  |  |  |  |
| 650 m.w. | 0.286 | 90 |  |  |  |  |  |  |  |  |  |  |  |  |
| Polyester diol 950 m.w. (from adipic acid, neopentyl glycol,1,6-hexane diol) |  |  |  |  |  |  |  |  |  |  | 0.286 | 136 |  |  |
| bis(2-hydroxyethyl)hydroquinone |  |  |  |  | 0.286 | 28.3 |  |  |  |  |  |  |  |  |
| bis(2-hydroxyethyl)bis-phenol A |  |  |  |  |  |  | 0.286 | 46.9 |  |  |  |  |  |  |
| 1,4-Cyclohexane dimethanol | 0.286 | 20.4 | 0.286 | 20.4 |  |  |  |  |  |  | 0.286 | 20.4 | 0.286 | 20.4 |
| Dimethanol propionic acid | 0.432 | 28.8 | 0.432 | 28.8 | 0.432 | 28.8 | 0.432 | 28.8 | 0.428 | 28.7 | 0.428 | 28.7 | 0.428 | 28.7 |
| Caprolactone diol 1250 m.w. |  |  | 0.19 | 117 |  |  |  |  |  |  |  |  |  |  |
| Caprolactone diol 530 m.w. |  |  | 0.096 | 25 |  |  |  |  |  |  |  |  |  |  |
| Polypropylene diol 1000 m.w. |  |  |  |  |  |  |  |  |  |  |  |  | 0.286 | 143 |
| Methyl pyrrolidone |  | 163 |  | 152 |  | 130 |  | 164 |  | 152 |  | 170 |  | 154 |
| Toluene diisocyanate 80:20 | 0.775 | 67.4 | 0.775 | 67.4 | 0.775 | 67.4 | 0.775 | 67.4 | 0.775 | 67.4 | 0.775 | 67.4 | 0.775 | 67.4 |
| Diphenylmethane diisocyanate 77:23 | 0.775 | 96.8 | 0.775 | 96.8 | 0.775 | 96.8 | 0.775 | 96.8 | 0.775 | 96.8 | 0.775 | 96.8 | 0.775 | 96.8 |
| Water |  | 504 |  | 629 |  | 671 |  | 678 |  | 633 |  | 621 |  | 631 |
| Triethyl amine | 0.227 | 22.9 | 0.227 | 22.9 | 0.227 | 22.9 | 0.227 | 22.9 | 0.227 | 22.9 | 0.227 | 22.9 | 0.227 | 22.9 |
| Hydrazine 64% |  | 12.3 |  | 12.3 |  | 12.3 |  | 12.3 |  | 12.3 |  | 12.3 |  | 12.3 |
| pH |  | 7.5 |  | 8.0 |  | 8.2 |  | 7.5 |  | 8.0 |  | 8.2 |  | 8.2 |
| Viscosity, cps |  | 100 |  | 84 |  | 120 |  | 200 |  | 90 |  | 130 |  | 940 |
| Solids % |  | 30.5 |  | 30.5 |  | 31 |  | 31 |  | 31 |  | 31 |  | 31 |

|  | Example 17 | | Example 18 | | Example 19 | | Example 20 | |
|---|---|---|---|---|---|---|---|---|
|  | equiv | g | equiv | g | equiv | g | equiv | g |
| Polyester diol m.w. 3206 (from adipic acid, neopentyl glycol,1,6-hexane diol) | 0.4 | 640 | 0.4 | 640 |  |  |  |  |
| Dimethanol propionic acid | 0.45 | 30.15 | 0.45 | 30.15 | 0.428 | 28.3 | 0.428 | 28.8 |
| Trimethylol propane | 0.15 | 6.7 | 0.15 | 6.7 |  |  |  |  |
| Cyclohexane dimethanol |  |  |  |  |  |  | 0.143 | 10.2 |
| 1,4-Butane diol |  |  |  |  |  |  | 0.143 | 6.3 |
| N,N—bis(2-hydroxy propyl) aniline |  |  |  |  | 0.286 | 29.9 |  |  |
| Polytetramethylene diol m.w. 1000 |  |  |  |  | 0.286 | 143 | 0.286 | 143 |
| bis-(4-isocyanatocyclohexyl)-methane | 1.0 | 131 |  |  |  |  |  |  |
| Toluene diisocyanate 80:20 |  |  |  |  | 0.775 | 67.4 | 0.775 | 67.4 |
| Diphenylmethane diisocyanate 77:23 | 0.5 | 62.5 | 0.5 | 62.5 | 0.775 | 96.8 | 0.775 | 96.8 |
| Isophorone diisocyanate |  |  | 1.0 | 111.1 |  |  |  |  |
| N—Methyl pyrrolidone |  | 373 |  | 364 |  | 130 |  | 126 |
| Methyl ethyl ketone |  |  |  |  |  | 26 |  | 25 |
| Water |  | 1668 |  | 1616 |  | 651 |  | 622 |
| Triethyl amine | 0.156 | 15.9 | 0.156 | 15.9 | 0.227 | 22.9 | 0.227 | 22.9 |
| Hydrazine |  | 11.87 |  | 11.8 |  | 12.3 |  | 12.3 |
| pH |  | 8.2 |  | 8.0 |  | 8.0 |  | 8.2 |
| Viscosity, cps |  | 130 |  | 150 |  | 110 |  | 100 |

| | | | | |
|---|---|---|---|---|
| Solids % | 30 | 30 | 31 | 31 |

I claim:

1. An aqueous polyurethane dispersion wherein the polyurethane comprises the reaction product of
   (a) an unblocked isocyanate-terminated polyurethane prepolymer containing carboxylic acid salt groups formed by reacting:
      (i) a polyisocyanate component containing at least 1% by weight of diphenylmethane-2,4'-diisocyanate, and
      (ii) an active hydrogen containing component containing at least one polyol having a molecular weight of from 62 to about 6000 and a carboxy group containing diol, in such proportions that the ratio of the number of isocyanate groups to the number of hydroxyl groups is in the range from about 1.1:1 to about 6:1, and
   (b) an active hydrogen containing chain extender selected from the group consisting of water, ammonia, a primary or secondary aliphatic, alicyclic, aromatic araliphatic or heterocyclic amine, hydrazine or a substituted hydrazine, the ratio of active hydrogens in the chain extender excluding water to isocyanate groups in the prepolymer being in the range from 1.0:1 to 1.75:1.

2. A dispersion according to claim 1 wherein the polyisocyanate component contains at least 5% by weight of diphenylmethane-2,4'-diisocyanate.

3. A dispersion according to claim 2 wherein the polyisocyanate component contains at least 10% by weight of diphenylmethane-2,4'-diisocyanate.

4. A dispersion according to claim 1 wherein the polyisocyanate component is a mixture of te 2,4'- and 4,4'-isomers of diphenylmethane diisocyanate containing from 5 to 70% by weight of the 2,4'-isomer.

5. A dispersion according to claim 1 wherein the polyisocyanate component comprises:
   (i) from 10 to 60% by weight of toluene diisocyanate, and
   (ii) from 90 to 40% by weight of a mixture of 4,4'- and 2,4'-diphenylmethane diisocyanates containing from 5 to 70% by weight of the 2,4'-isomer.

6. A dispersion according to claim 5 wherein the polyisocyanate component comprises from 30 to 50% by weight of toluene diisocyanate and from 70 to 50% by weight of a 4:4'-/2,4'-diphenylmethane diisocyanate mixture containing from 10 to 40% by weight of the 2,4'-isomer.

7. A dispersion according to claim 1 wherein the active hydrogen containing component comprises:
   (i) a polymeric diol having a molecular weight of from 500 to 6000,
   (ii) from 1 to 2 moles, per mole of polymeric diol, of a carboxy group containing diol and
   (iii) from 0 to 1 mole, per mole of polymeric diol, of a diol having a molecular weight from 62 to 300.

8. A dispersion according to claim 7 wherein the polymeric diol is a polyether or polyester diol.

9. A dispersion according to claim 8 wherein the polymeric diol is a polytetramethylene ether glycol.

10. A dispersion according to claim 7 wherein the carboxy group containing diol is 2,2-dimethylol-propionic acid.

11. A dispersion according to claim 7 wherein the diol having a molecular weight from 62 to 300 is cyclohexane dimethanol.

12. A dispersion according to claim 1 wherein the chain extender is selected from hydrazine, ethylene diamine, menthane diamine, 1,3-phenylene diamine and 1,4-phenylene diamine.

13. A coated article obtained by applying an aqueous polyurethane dispersion according to claim 1, to a substrate.

* * * * *